Figure 1:
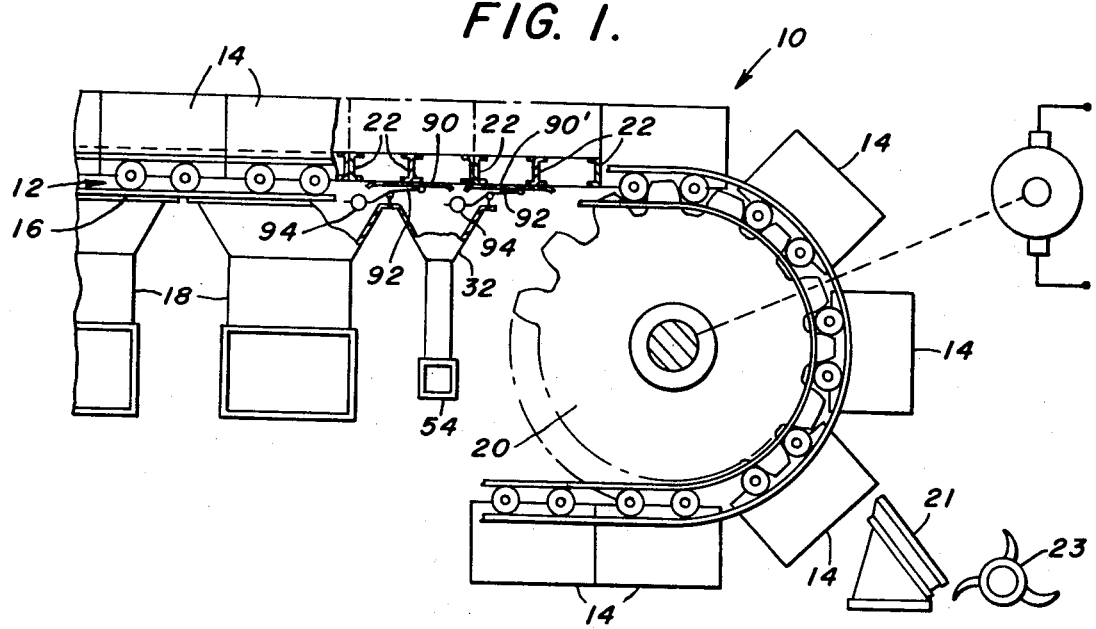

United States Patent [19]

Möller et al.

[11] 3,713,634
[45] Jan. 30, 1973

[54] DEVICE FOR SEALING TRAVELLING GRATES

[75] Inventors: Klaus Möller; Dietrich Münch; Hartmut Wölert, all of Frankfurt/Main, Germany

[73] Assignee: Dravo Corporation, Pittsburgh, Pa.

[22] Filed: Aug. 24, 1970

[21] Appl. No.: 66,185

[30] Foreign Application Priority Data

Aug. 23, 1969 Germany...............P 19 43 024.1

[52] U.S. Cl.................................................266/21
[51] Int. Cl................................................F27b 21/02
[58] Field of Search.................................266/20, 21

[56] References Cited

UNITED STATES PATENTS 2,055,941  9/1936  Newhouse..............................266/21

FOREIGN PATENTS OR APPLICATIONS 220,774  1/1958  Australia................................266/21

Primary Examiner—Gerald A. Dost
Attorney—Parmelee, Utzler & Welsh

[57] ABSTRACT

A device for use in a travelling grate type metallurgical processing machine to seal an end wind box against the passage of external air thereinto or gases therefrom. The device includes a sealing plate arranged adjacent an end wind box and in abuttment with the under support surfaces of the pallets as they pass over the plate. A lever supports the plate in its abutting relationship with the pallets. The lever is pivotally supported at an intermediate point to the machine structure and has one end pivotally fixed to the underside of the sealing plate. The plate is, thus, able to move away from the pallet but not laterally thereof. A counterweight is arranged on the free end portion of the lever to provide a uniform pressure on the plate, while permitting flexing thereof. An optional sealing box is provided opposite the sealing plate for drawing in any gases flowing between the sealing plate and the pallets.

8 Claims, 5 Drawing Figures

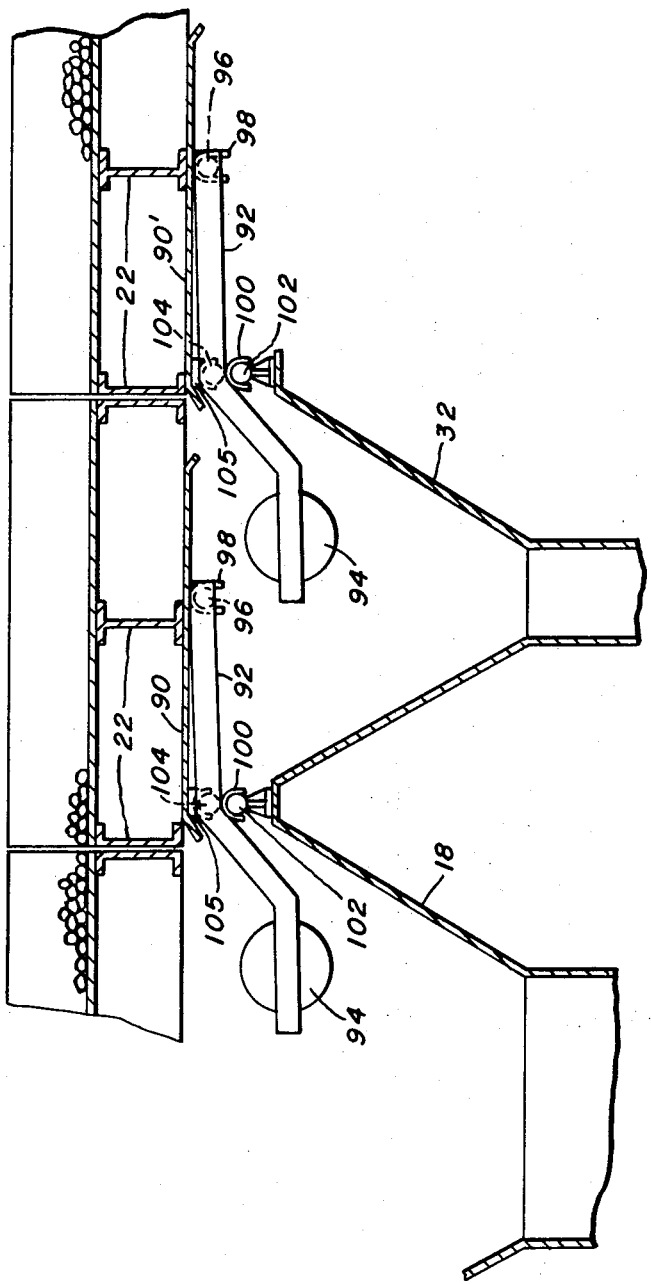

DEVICE FOR SEALING TRAVELLING GRATES

This invention relates to a sealing device for use in travelling grate type metallurgical processing vessels, and more particularly to a device for sealing an end wind box of such a machine against the passage of air thereinto or gases therefrom.

Straight line traveling grate machines, such as sintering or palletizing machines usually have an open area between the end wind boxes and the support structure at the charge and discharge ends of the machine. These open areas must be sealed as well as practicable in order to prevent the penetration of external air into the wind boxes or the escape of gases from the wind boxes. An especially good sealing of the discharge end wind box is necessary where the operation of sintering machines is controlled by measuring the waste gas temperature in that wind box. Any external air which would be drawn into the discharge end wind box would prevent any accurate measurement of the waste gas temperature therein.

Attempts have been made to seal the open end areas. Sealing plates have been arranged outwardly adjacent the end wind boxes with as little clearance as possible to the underside of the pallets passing over the plate. With a fixed sealing plate the problem of jamming of the pallets thereon existed. In order to avoid jamming the plates were mounted to flex downwardly away from the pallet. A spring type mounting was used to provide this flexing. However, such a flexible mounting of the sealing plates was not entirely adequate in preventing penetration of excess air into or escape of gases from the end wind box as the plates were flexed. In addition, the spring mounted plates had a tendency to move laterally with respect to the pallets and thereby open more escape areas for the gases.

We overcome the drawbacks of the old end wind box sealing plate arrangement by providing a device which includes a sealing plate mounted so as to tightly engage the underside of the pallets while being able to flex away from the plate without any lateral movement. More particularly, our device, preferably, includes two sealing plates arranged one behind the other in the direction of travel of the pallets, each of which extends over at least two pallet cross-supports. Each of the sealing plates is pressed against the pallet supports by means of a structure which allows the plate to move away from the pallets to avoid jamming while preventing lateral shifting thereof. We provide this structure preferably by means of at least one lever arrangement. The lever is pivotally supported at an intermediate point thereof to the machine structure One end of the lever is pivotally secured to the sealing plate. The lever is also provided with a biasing means, such as a weight, for urging the sealing plate in the direction of the pallets while allowing it to flex when an external force is applied to the plate. By virtue of this lever support arrangement the sealing plates are able to flex away from the pallets without any transverse shifting.

The front and back edges of the sealing plates are preferably designed so as to curve downwardly. In this way, jamming of the pallet cross-supports against the edges of the sealing plate is avoided both during forward and backward travel of the pallets.

One sealing plate may be used, with or without a central opening therethrough. With the central opening, or with a pair of plates arranged one behind the other, a sealing box may be arranged opposite the opening or the space between the plates. The sealing box may be connected with a source of suction for exhausting any small amount of air or gases flowing between the plates and pallets. The sealing box arrangement will prevent practically any penetration of excess air into the wind boxes and thereby provide accurate waste gas temperature measurement in the discharge end wind box.

Another feature of the preferred embodiment of the invention is the provision of sealing means between the pivot supports of levers and the wind box and sealing box.

Other details and advantages of this invention will become apparent as the following descriptions of certain present preferred embodiments thereof proceed.

In the accompanying drawings we have shown certain present preferred embodiments of this invention in which:

FIG. 1 is a schematic representation of the discharge end of a travelling grate type metallurgical processing machine, such as a sintering machine, in side elevation showing the sealing device of this invention and the pallets above the device with parts cut away;

FIGS. 2 to 5 are enlarged longitudinal sectional views through the sintering machine at the location of the sealing device, and illustrating different embodiments of the invention. Referring now to the drawings, wherein like reference numerals refer to like parts throughout the various views, there is shown in FIG. 1 the discharge end of a down draft sintering machine, generally designated by numeral 10, including a closed path indicated generally by 12 on which runs a series of pallets 14 carrying a charge to be sintered. A buss wheel is provided at the charging end of the machine for carrying the pallets 14 from the lower or return traverse of the closed path to the work traverse 16 where the pallets are moved over a series of wind boxes 18. The wind boxes 18 are connected with a source of suction for drawing air downwardly through the charge and for drawing combustion gases from the charge. At the discharge end of the machine, the pallets 14 are seized by a lowering wheel 20 which moves the pallets along the curved path to dump the sinter charge onto a grate 21 where it is fed to a crusher 23.

Figure 2:
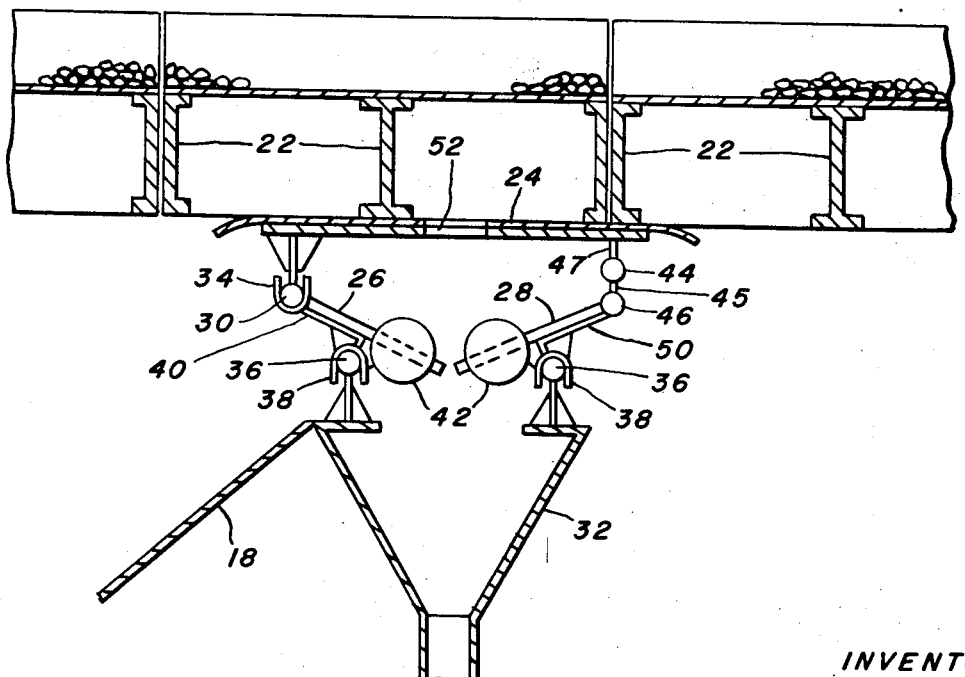

As shown in the broken away portion of FIG. 1, the pallets 14 include transversely extending bottom cross-supports 22 comprising a central I-beam and end channel members. A sealing plate 24, as shown in FIG. 2, is arranged at the discharge end of the machine to press against cross-supports 22 as the pallets 14 are propelled over work traverse 16. Sealing plate 24 extends across the entire width of the cross-supports and is held in place by lever members 26 and 28 through pivotable supports. Lever 26 is connected at one end to sealing plate 24 by a pivot coupling including an elongated rod 30 fixed to the sealing plate and extending across the width thereof to beyond the sides of a sealing box 32 arranged below the sealing plate 24 and adjacent the discharge end wind box 18. A U-shaped member 34 is fixed to the lever 26 to rotatably engage rod 30. An elongated rod 36 is arranged on the edge of sealing box 32 and, as with rod 30, extends across the width of sealing plate 24 to beyond the sides of sealing box 32. A U-shaped member 38 is fixed to an intermediate point of lever 26 to rotatably engage rod 36. A plate 40 is fixed between the U-shaped members 30 and 38, and thus the end wind box 18 and the area downstream (i.e. to the right of the wind box as viewed in the figures) of lever 26 are closed off from each other. A weight 42 is fixed to the downstream end of lever 26 and serves to pivot the lever about rod 36 to thereby urge sealing plate 24 against the cross-supports 22. The downstream end of sealing plate 24 is supported by lever 28 in a similar fashion as its upstream end, with an identical intermediate pivot support 36 and 38, but with a double articulated connection at the sealing plate. The double articulated connection includes elongated rod 46 rotatably supported by the end of lever 28 and extending across the width of the pallets 14. Rod 44 comprises the other part of the articulated connection, and is rotatably secured to elongated strip members 45 and 47 all of which extend beyond the ends of sealing box 32. A plate member 50 is fixed between U-shaped member 38 and rod 46. Sealing plate 24, rods 44 and 46, and strips 45 and 47 with plate member 50 close the upstream side of lever 28 from the downstream side thereof. A weight 42 is fixed to the upstream end of lever 28 and serves the same function as the weight on lever 26 of urging sealing plate 24 into sealing engagement with pallet support structure 22. Sealing plate 24 is provided with a central opening 52 to allow passage of any air or gas flowing between the plate and cross-supports 22 to flow into sealing box 32 which, as shown in FIG. 1, includes a line 54 for connection with a source of suction.

Figure 3:
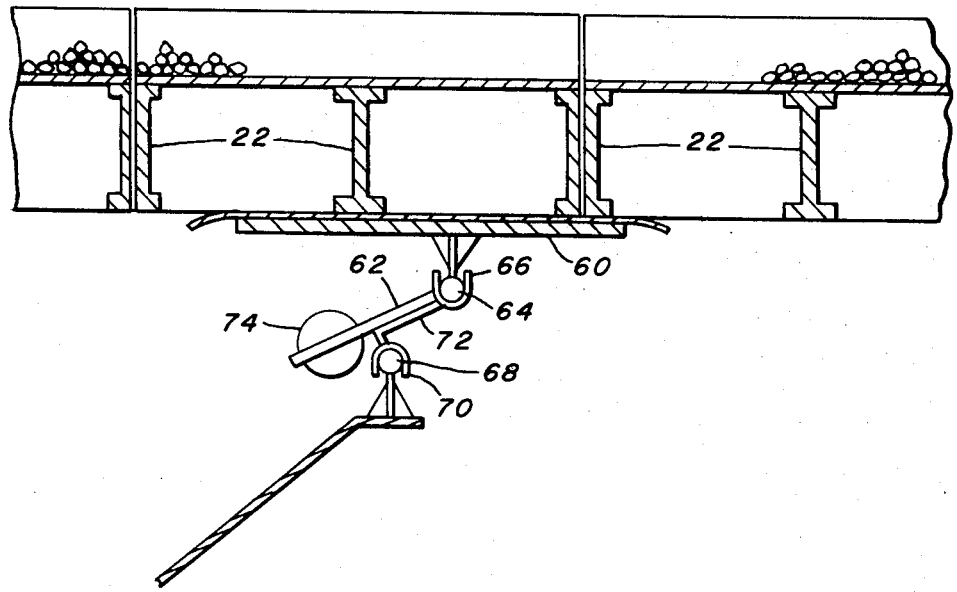
Figure 4:
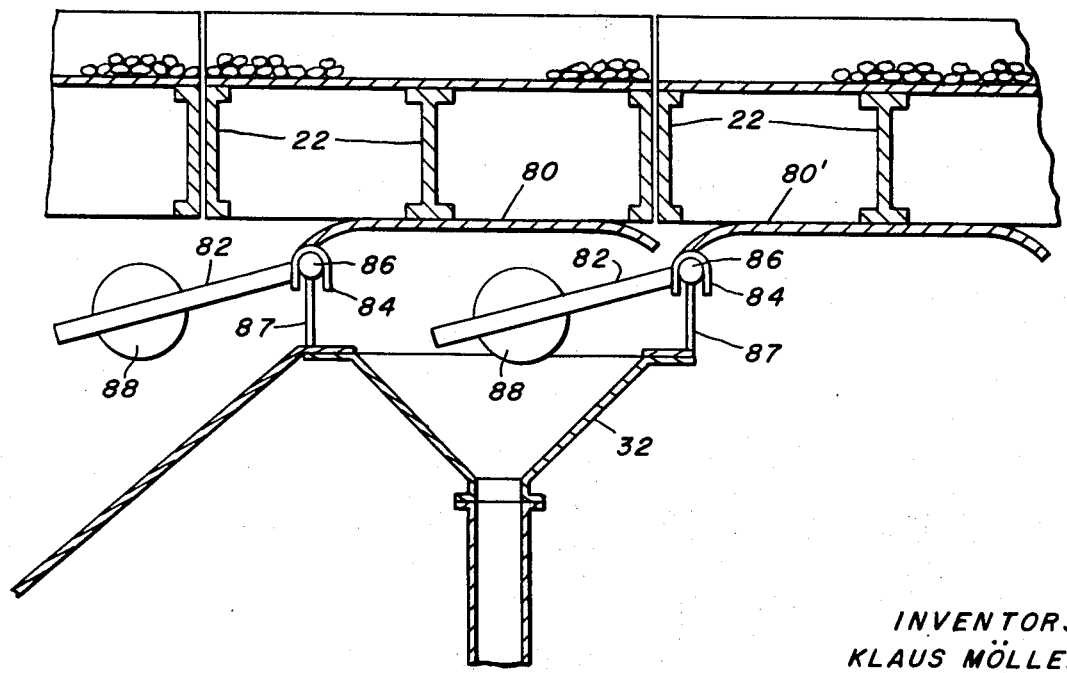

FIGS. 3 and 4 show two other embodiments of this invention. FIG. 3 shows a sealing plate 60 in engagement with cross-supports 22 and supported by a single lever 62 coupled at one end to a pivot rod 64 fixed to plate 60. a U-shaped member 64 is fixed to one end of lever 62 and rotatably engages rod 64. A rod 68 is fixed to the support structure of the machine and is rotatably engaged by U-shaped member 70 fixed to an intermediate point of lever 62. A plate member 72 is fixed between U-shaped members 66 and 70 to seal the downstream side of lever 62 from the upstream side thereof. A weight 74 is fixed to the free end of lever 62 for urging sealing plate 68 into engagement with cross-supports 22.

FIG. 4 illustrates a double sealing plate arrangement of the device of this invention. Identical sealing plates 80 and 80' are arranged one behind the other in sliding engagement with cross-supports 22 of pallets 14. The sealing plates 80 and 80' are spaced from each other, and a sealing box 32 is arranged beneath the plates and opposite the spacing therebetween. Sealing plate 80 is supported by a single lever 82 which is connected to an elongated U-shaped member 84, which in turn has the closed end thereof fixed, as by welding, to the upstream end portion of plate 80. An elongated rod 86 is fixed to sealing box 32 structure by a plate arrangement 87 which extends across the width of the box. Rod 86 is rotatably coupled with U-shaped member 84. The upstream end of lever 82 is provided with a weight 88 which serves to urge the sealing plate 80 against the cross-support 22. The downstream sealing plate 80' is supported by an identical lever arrangement as just described in regard to upstream plate 80. Thus, sealing plate 80 and 80', the U-shaped members 84 and the plates 87 serve to seal the discharge end wind box 18 from the outside atmosphere, while sealing box 32 will serve to draw in any air or gas flowing between the sealing plates and the cross-supports of the pallets.

FIG. 5 shows yet another embodiment of this invention. This embodiment is also schematically represented in FIG. 1. The embodiment of FIG. 5 is a double sealing plate arrangement, and includes a pair of identical sealing plates 90 and 90' spaced one behind the other in the direction of travel of the pallets. A sealing box 32 is arranged for drawing any gases flowing between the sealing plates and the cross-supports through the spacing between the plates. Upstream plate 90 is supported by lever 92 which is zig-zag shaped with the lower or upstream leg thereof being provided with weight 94 and the upper or downstream leg being connected with the sealing plate 90. The downstream end of lever 92 which is rotatably coupled to U-shaped member 98 is fixed at its closed upper end to sealing plate 90. Both rod 96 and U-shaped member 98 extend across the width of sealing plate 90 to beyond both ends of sealing box 32. A U-shaped member 100 is disposed beneath lever 92 and fixed at its upper and closed end to an intermediate point of lever 92. Member 100 is rotatably coupled with rod 102 which is fixed to the support structure of the machine 10. Both U-shaped member 100 and rod 102 extend beyond both ends of sealing box 32. An elongated rod 104 is fixed to an elongated sealing member 105 which in turn is fixed to and extends across an upstream end portion of sealing plate 90. Rod 104 abuts the top surface of U-shaped member 100 in sealed relationship therewith. Sealing plate 90' is supported in identical fashion as sealing plate 90.

In all the embodiments described the lever members would preferably be arranged outside of the sealing box 32. Identical lever assemblies would be provided on each lateral side of the sealing box, although one lever assembly could perform the intended function. It should also be noted that both ends of the sealing plates are preferably curved downwardly in order to avoid jamming of the pallet cross-supports with the plate during both forward and backward movement of the pallets.

Although the levers are described and illustrated as being weighted to urge the sealing plates against the pallet cross-supports, other biasing means, such as springs and hydraulic cylinders, could also be used. Also, the device of this invention is applicable to the charging end of the machine even though this description was directed to the discharge end.

While we have shown and described certain present preferred embodiments of this invention, it is to be distinctly understood that the invention is not limited thereto but may be otherwise variously embodied within the scope of the following claims.

We claim:

1. In a travelling grate type metallurgical processing machine including wind boxes arranged to receive hot gases flowing through end-to-end disposed pallets as they are propelled along the work traverse of the guide path forming part of the machine, the wind boxes extending between the charge and discharge portions of the work traverse; apparatus for sealing an end wind box against the passage of external air thereinto or gases therefrom, comprising:

at least one sealing plate member arranged along the work traverse and outwardly adjacent and in sealing relationship with an end wind box, and in abuttment with the under support surfaces of the pallets as they pass over the plate member;

support means for supporting said plate member in sealing engagement with the underside of the pallets while permitting flexing thereof away from the pallets in response to a force of predetermined amount imported thereto, and restraining any lateral movement thereof, said support means being in sealing relationship with the wind box adjacent thereto, and wherein said support means includes at least one lever member pivotally fixed at an intermediate point thereof to the machine structure, with one end thereof being pivotally fixed to the underside of the plate member; and pressure means operative with said support means for urging a uniform pressure on said plate member in the direction of the pallets whereby said plate member will be restored to its original position when the flexing force is removed therefrom.

2. In a travelling grate type metallurgical processing machine including wind boxes arranged to receive hot gases flowing through end-to-end disposed pallets as they are propelled along the work traverse of the guide path forming part of the machine, the wind boxes extending between the charge and discharge portions of the work traverse; apparatus for sealing an end wind box against the passage of external air thereinto or gases therefrom, comprising:

a pair of sealing plate members arranged along the work traverse one behind the other in the direction of travel of the pallets, said sealing plate members being outwardly adjacent and in sealing relationship with an end wind box and in abuttment with the under support surfaces of the pallets as they pass over the plate members;

a sealing box is arranged opposite the space between the sealing plates, said sealing box having means for coupling same to a source of suction whereby any gas flowing between the sealing plate members and the pallet support surfaces will be drawn through the space between the plate members and into said sealing box;

support means for supporting said plates members in sealing engagement with the underside of the pallets while permitting flexing thereof away from the pallets in response to a force of predetermined amount imported thereto, and restraining any lateral movement thereof, said support means being in sealing relationship with the wind box adjacent thereto; and pressure means operative with said support means for urging a uniform pressure on said plate members in the direction of the pallets whereby said plate members will be restored to their original position when the flexing force is removed therefrom.

3. The apparatus as set forth in claim 1 including a sealing box arranged opposite said plate member, said sealing box having means for coupling same to a source of suction whereby any gas flowing between said plate member and the pallet support surfaces will be drawn into said sealing box.

4. The apparatus as set forth in claim 1 including a pair of sealing plate members arranged one behind the other in the direction of travel of the pallets; and further including a sealing box arranged opposite the space between the sealing plates, said sealing box having means for coupling same to a source of suction, whereby any gas flowing between the sealing plate members and the pallet support surfaces will be drawn through the space between the plate members and into said sealing box.

5. The apparatus as set forth in claim 1 including elongated sealing members extending laterally of said plate member and across the pivot points fixing the lever member to the machine and plate member, respectively.

6. In a travelling grate type metallurgical processing machine including wind boxes arranged to receive hot gases flowing through end-to-end disposed pallets as they are propelled along the work traverse of the guide path forming part of the machine, the pallets including transverse cross-supports arranged across the bottom thereof, the wind boxes extending between the charge and discharge portions of the work traverse; apparatus for sealing an end wind box against the passage of external air thereinto or gases therefrom, comprising:

at least one rigid sealing plate member arranged along the work traverse and outwardly adjacent an end wind box to abut the under surfaces of at least two successive cross-supports of the pallets as the pallets pass over the plate member;

at least one support lever supporting said plates member in abuttment with the cross-supports, said lever being pivotally supported at an intermediate point thereof to the machine structure and one end of the lever being pivotally fixed to the underside of the plate member;

biasing means operative with the lever for urging the lever to pivot about its intermediate pivot support in the direction of the plate member to apply a uniform pressure on the plate member, such pressure being of a magnitude to permit said plate member to flex away from the pallets in response to a force of predetermined amount imparted thereto, whereby the plate member will be restored to its original position when the flexing force is removed therefrom; and sealing strips extending transversely of the plate member and across the pivot supports of said lever, and so arranged to seal the lever with respect to the wind box adjacent thereto.

7. The apparatus as set forth in claim 6 including a pair of sealing plate members arranged one behind the other in the direction of travel of the pallets; and further including a sealing box arranged opposite the space in between the sealing plates, said sealing box having means for coupling same to a source of suction, whereby any gas flowing between the sealing plate members and the pallets will be drawn through the space between the plate members and into the sealing box.

8. The apparatus as set forth in claim 6 wherein said plate member has at least one opening through an intermediate portion thereof; and including a sealing box arranged opposite said opening, said sealing box having means for coupling same to a source of suction, whereby any gas flowing between said plate member and the pallet will be drawn into said sealing box.

* * * * *